United States Patent [19]

Mendiberri

[11] 4,216,925
[45] Aug. 12, 1980

[54] HELICOPTER OF THE TYPE HAVING TWO COAXIAL COUNTERROTATING ROTORS WITH A DRIVE MECHANISM INTERPOSED BETWEEN THE POWER PLANT AND THE ROTORS

[76] Inventor: Vicente Mendiberri, Rosario 84 - Capital, Buenos Aires, Argentina

[21] Appl. No.: 951,141

[22] Filed: Oct. 13, 1978

[30] Foreign Application Priority Data

Oct. 18, 1977 [AR] Argentina .................... 269629

[51] Int. Cl.³ .................................... B64D 35/06
[52] U.S. Cl. ............................ 244/60; 74/665 K; 416/129
[58] Field of Search ................... 244/60, 17-23; 416/124, 126, 128, 129; 74/664, 665 A, 665 B, 665 F, 665 G, 665 GB, 665 GC, 665 K

[56] References Cited

U.S. PATENT DOCUMENTS

| 2,085,483 | 6/1937 | Trebucien | 416/129 |
| 3,450,208 | 6/1969 | Barton | 416/129 X |
| 3,669,564 | 6/1972 | Garfinkle | 416/129 X |

*Primary Examiner*—Barry L. Kelmachter
*Attorney, Agent, or Firm*—Fleit & Jacobson

[57] ABSTRACT

The invention provides a helicopter of the type having two coaxial counterrotating rotors with a differential drive mechanism interposed between the power plant and the rotors. The power output of the power plant is coupled to the power input of the differential drive which has two power outputs, one of which is directly connected to the mounting hub of one of the rotors and the other one is connected to the mounting hub of the other rotor through a rotation inverting mechanism. Two embodiments are described and illustrated which differ only by the construction of the differential and the rotation inverting mechanisms.

6 Claims, 7 Drawing Figures

HELICOPTER OF THE TYPE HAVING TWO COAXIAL COUNTERROTATING ROTORS WITH A DRIVE MECHANISM INTERPOSED BETWEEN THE POWER PLANT AND THE ROTORS

BACKGROUND OF THE INVENTION

1. Field of the Invention

This invention relates to helicopters in general, and more particularly to a helicopter of the type having two coaxial counterrotating rotors with a drive mechanism interposed between the normal power plant of the aircraft and the rotors.

2. Description of the Prior Art

In general there are known two main types of helicopters: (1) the type having two counterrotating rotors (which may or may not be coaxial), and (2) the type having a single main rotor and an auxiliary anti-torque tail rotor.

In the case of helicopters pertaining to type (2) the auxiliary anti-torque tail rotor requires about 20 to 30% of the power which the power plant is capable of delivering, this power being subtracted from the power which otherwise would be deliverable to the main rotors, contrarily to the case of helicopters having two counterrotating rotors in which the torque of one rotor acts in a direction opposite to the direction of the torque of the other rotor. Stated in another way, the power-weight ratio is more favorable in helicopters pertaining to type (1). Also, in the case of helicopters pertaining to type (2) the drive means provided between the power plant and the tail rotor makes more complicated the design and construction and increase the weight of the aircraft, thus worsening even more the power-weight ratio. Another fact is that the main rotor works asymmetrically because the lift generated by the blade of the main rotor which is rotating against the relative wind produced by the horizontal displacement of the aircraft is greater than that produced by the other blade, thus producing a tendency to lateral unbalance which is cyclically reverted at each half-revolution of the rotor. Such a lateral instability must be corrected by rather complicated mechanisms which change proportionately and oppositely the angle of attack of each blade with respect to the other at each half-revolution of the rotor.

A helicopter pertaining to type (1) allows the elimination of the above mentioned drawbacks. It does not require the use of an antitorque tail rotor since the oppositely rotating rotors produce corresponding torques of opposite directions mutually cancelling one another. The absence of an anti-torque tail rotor allows a maximum utilization of the power generated by the power plant. Also, the elimination of the tail rotor allows a simplification of the drive and control mechanism thereof, thus reducing the weight of the aircraft and improving the power-weight ratio. Referring to the asymmetry of lift produced by the relative wind, which is characteristic of each rotor individually considered, it must be remembered that since the rotors are coaxial and rotate in opposite directions, said asymmetry in one rotor is opposite to the asymmetry in the other, and thus are mutually cancelled. At least theoretically, this allows greater simplicity and better lateral balance.

Bearing in mind these favorable characteristics of the helicopter having two coaxial counterrotating rotors, it would have been only logical to expect that this type of helicopter would have gained a considerably greater acceptance than the single rotor helicopter having a tail rotor. However, just the contrary has happened. This apparently strange fact is due to a series of factors which detract from a good performance of the helicopter with two coaxial counterrotating rotors. Some of the factors involved are: the efficiencies of the rotors are unequal, the cause of which is the influence of the upper rotor air stream on the lower rotor, and the different aerodynamic conditions of the corresponding horizontal air layers in which each rotor is working. This is constantly producing deviations from the normal flight attitude and normal flight path. This is turn requires that the pilot makes constantly corrections by means of the flight controls of the aircraft and this makes pilotage a very tiresome task for the air pilot, specially during long flights, and a dangerous task during certain maneuvers such as aerial spraying with plaguicide and herbicide compounds and the like at low altitude, rescue operations, etc., in which high stability is an essential security factor.

It is known that pilot fatigue is the main factor producing serious or fatal accidents.

Thus in the light of all what has been said above, it would be highly desirable to improve the flight stability and maneuverability of helicopters of the type having two coaxial counterrotating rotors and thus reducing pilot fatigue.

It will also be obvious to the skilled in this art, that the continuously variable instabilities and asymmetries of the working conditions of the rotors produce continuously variable power demands from each rotor and thus produce continuously increasing and decreasing stresses and strains in the component parts and the materials from which they are made, inducing vibrations which reduce the useful life thereof and there being the potential risk of fractures of critical components. Thus eliminating such instabilities and asymmetries it would be possible to extend the useful life of such component parts obtaining the same security factor with lesser amount of material and/or lesser critical quality thereof with the possibility of increasing the power-weight ratio and highly increasing the security factor.

To achieve such desideratums it would be necessary that each rotor individually obtains in each instant the necessary proportion of the total motive power which the power plant is capable of producing and that this distribution of power would be as exact as possible. In other words, if in a certain instant one of the rotors requires 5% more power than the other one and the total power supplied by the power plant is 100%, then said rotor would be supplied with 55% of the total available power and the other rotor would be supplied with only 45%. Moreover, this distribution must take place automatically without any operation of the controls of the aircraft by the pilot. This would reduce considerably pilot fatigue and the stresses imposed on critical component parts.

SUMMARY OF THE INVENTION

Thorough researchs and analysis of the problems involved, which were started many years ago by the applicant, have allowed to finally state specifically their characteristics, giving rise to the present invention which offers an integral solution of all the difficulties above stated.

This invention offers such an integral solution providing a helicopter having two coaxial counterrotating rotors with a differential drive mechanism between the power plant and the rotors.

While the use of a differential mechanism is already known in terrestrial automotive vehicles and other machines and was invented by the French mechanician Onesphore Pecquer in 1827, the specific mechanical construction of the differential drive mechanism used in the present invention is different from the known devices of this kind. In the case of this invention it is necessary to drive independently two coaxial shafts each one rotating the blades of a corresponding rotor, the two rotors being driven in opposite directions of rotation, while in the case of a conventional terrestrial automotive vehicle the power input shaft of the differential mechanism must drive two output shafts in the same direction of rotation, the said output shafts (carrying the drive wheels of the vehicle) projecting in opposite directions from the differential mechanism perpendicularly with respect to the power input shaft.

According to the present invention, there will be described and illustrated two embodiments of the differential mechanism which are operatively alike but of different construction. The skilled in this art will easily understand that both embodiments are comprised within the true spirit and scope of the invention. One difference is that in the first embodiment the upper rotor drive shaft is associated with the lower crown gear of the differential mechanism and the lower rotor drive shaft is associated with the upper crown gear, while in the second embodiment the opposite is true. Another difference is that the arrangement inverting the direction of transmission of power is arranged between the upper crown gear of the differential mechanism and the mounting hub of the lower rotor in the first embodiment, while in the second embodiment it is arranged between the lower crown gear of the differential mechanism and the mounting hub of the lower rotor, in each case through the corresponding rotor drive axle.

The power input shaft of the differential mechanism can be arranged in two different ways, allowing the use of two different positions of the power plant. When it is desired to arrange the power plant with its crankshaft in a horizontal position, it will be desirable that the power input shaft projects laterally from the differential mechanism case also in a horizontal direction, but when it is desired to arrange the power plant with its crankshaft in a vertical position it will be desirable that said power input shaft projects downwardly from the differential mechanism case also in a vertical direction. This will be true indistinctly in the case of an engine of the radial type or of the type having its cylinders arranged in line.

In both embodiments the operation of the differential mechanism is substantially the same and the constructions are different only by the arrangement of the power input shaft.

Thus, a general object of the invention is to provide a helicopter of the type having two coaxial counterrotating rotors with a differential drive mechanism between the power plant and the rotors.

Another object is to provide a helicopter of the kind mentioned, in which the differential mechanism allows that each rotor will be supplied automatically with the exact proportion of the total power available from the power plant, as required by the rotor at every instant according to its instantaneous working conditions.

Another object is to provide a helicopter of the kind mentioned having a considerably higher flight stability than helicopters of the kind hitherto known.

Another object is to provide a helicopter of the kind mentioned which is capable of allowing a considerable reduction of the pilot fatigue during long flights and dangerous maneuvers while flying near the ground.

Another object is to provide a helicopter of the kind mentioned in which certain critical parts and the materials from which they are made are subjected to considerably lesser vibrations, strains and stresses, thus causing lesser fatigue of the materials and a greater security against premature failure and breakage which could produce serious accidents.

Another object is to provide a helicopter of the kind mentioned having a better power-weight ratio than other known aircrafts of the helicopter type.

Still another object of the invention is to provide a helicopter of the kind mentioned offering a considerably higher flight security than helicopters of more conventional types, specially during critical flight conditions which may arise while the pilot is performing certain aerial tasks like spraying plaguicide chemicals, rescue operations and other flight activities during which high stability and good maneuverability are essential.

These and other objects and advantages are achieved by the present invention which provides a helicopter of the type having two coaxial counterrotating rotors with a drive mechanism interposed between the power plant and the rotors, said power plant having a power output shaft, wherein said drive mechanism comprises a differential mechanism having a power input shaft coupled to said power output shaft of the power plant and two power output axles the first of which is drivingly coupled to the upper rotor and the second being drivingly coupled to the lower rotor, only one of said couplings between said power output axles and the corresponding rotor comprising a rotation inverting mechanism. The invention will be better understood through the following description of two of its presently prefered embodiments and the accompanying drawings.

BRIEF DESCRIPTION OF THE DRAWINGS

In the drawings.

The same reference numerals have been used in the various figures to designate the same or equivalent components.

DETAILED DESCRIPTION OF THE PREFERRED EMBODIMENTS OF THE INVENTION

Figure 1:
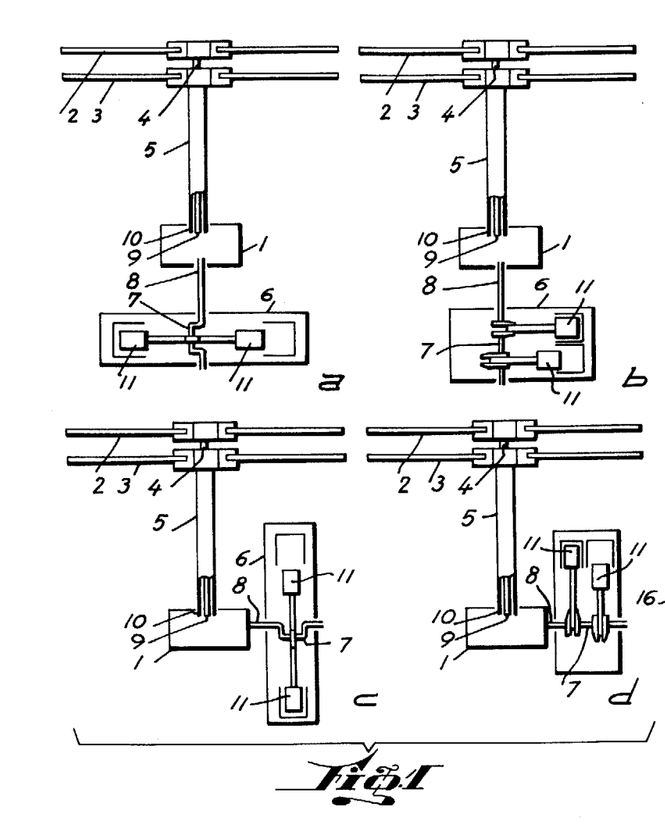
FIG. 1 is a purely schematic illustration of the arrangement of the differential drive mechanism of the present invention as applied to two different types of aircraft engines mounted in two main different positions, the various combinations being illustrated in A, B, C and D of FIG. 1.

Referring now particularly to FIG. 1 of the drawings it can be seen that in each of its illustrations A, B, C and D there is shown, in a highly schematic manner, the essence of the invention, that is to say that differential mechanism 1 arranged between the two coaxial counterrotating rotors 2 (upper rotor) and 3 (lower rotor), with their corresponding coaxial counterrotating drive axles 4 and 5 of which the rotor drive axle 5 is hollow and the rotor drive axle 4 passes coaxially through the hollow interior of axle 5, and the motive force generating plant 6 (which will be hereinafter generically designated "engine").

The present invention is described and illustrated in connection with embodiments thereof in which there is supposed the use of an engine of the internal combustion type having cylinders, pistons and a crankshaft; however the skilled in this art may easily understand that the present invention is also applicable, in all its aspects, to a helicopter equipped with any type of engine (including a turbine type engine) having a power output shaft capable of directly or indirectly supplying rotating movement power. Any engine capable of complying with this condition must be considered as being within the scope of the term "engine."

In FIG. 1A, the crankshaft 7 of the engine, which is the power output shaft, is coupled to the power input shaft 8 of the differential mechanism 1, one of the power outputs 9 being coupled to axle 4 of the upper rotor 2 and the other power output 10 being coupled to axle 5 of the lower rotor 3.

All four FIGS. 1A to 1D are essentially similar, illustrating the same basic principle of the invention, the difference being only in the type of engine 6 which is to be used, its arrangement with respect to the differential mechanism 1 and the necessarily different arrangement of the power input shaft 8 thereof.

In the case of FIG. 1A, there is illustrated an engine of the radial type with its cylinders 11 arranged in a plane which is in general horizontal and the crankshaft extending in a generally vertical direction. To be able to arrange the engine in such a position, the power input shaft 8 of the differential mechanism must be arranged to project downwardly from the later in a direction which is substantially parallel to the general direction of the power outputs 9 and 10 and the rotor axles 4 and 5, this including the case in which said shaft 8 is axially aligned with said power outputs 9 and 10.

FIG. 1B shows the use of an engine having cylinders 11 arranged in line. The crankshaft 7 of the engine 6 projects in a general vertical direction, the cylinders 11 being arranged in a plane which is also in general vertical. The arrangement of the power input shaft 8 with respect to the differential mechanism 1 and the concentric axles 4 and 5 of the rotors is the same as that of FIG. 1A.

FIG. 1C shows the use of a radial engine 6. Its crankshaft is directed in a general horizontal direction while its cylinders 11 are arranged in a plane which is in general vertically directed. The power input shaft is substantially perpendicular to the rotor axles 4 and 5 and projects horizontally from one side of the differential mechanism 1.

Finally, FIG. 1D shows the use of an engine 6 having cylinders 11 arranged in line, its crankshaft 7 projecting in a substantially horizontal direction and its cylinders 11 being arranged in a general vertical plane. In this case the power input shaft 8 extends in general perpendicularly to the rotor axles 4 and 5 and projects also in a substantially horizontal direction from one side of the differential mechanism 1.

In the four cases mentioned above an engine 6 having only two cylinders 11 has been schematically illustrated. However it will be understood that the engine may have any number of cylinders, and that it may also be an engine of the turbine type. Moreover, due to the highly schematic nature of FIGS. 1A to 1D, the crankshaft 7 has been illustrated, in all four cases, as directly connected to the power input shaft 8 and aligned therewith. The coupling between the crankshaft 7 and the power input shaft 8 may also be an indirect coupling through gears, belts and the like, and both components may not be aligned one with the other.

Figures 2, 3:
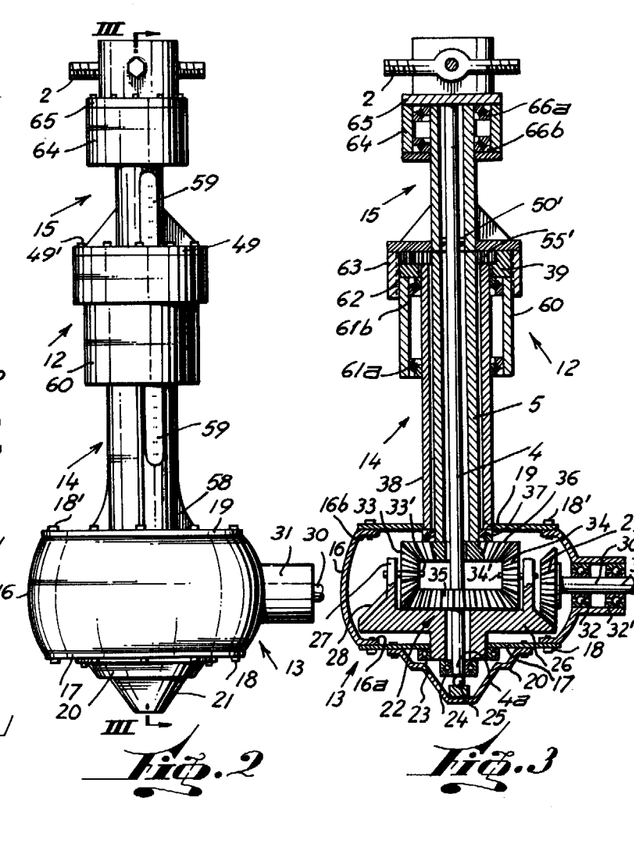
FIG. 2 is a schematic side elevation view of the assembly of the mast and the differential mechanism.
FIG. 3 is a schematic side elevation view of a vertical diametral cross-section of the assembly of FIG. 2.

As has been mentioned above, the essence of the invention is the differential mechanism 1 associated with the mast carrying the coaxial counterrotating drive axles 4 and 5. FIG. 2 shows a side elevation view of the assembly 12 comprising the mast and the differential mechanism, and FIG. 3 shows a diametral vertical cross-section of the same assembly along the plane III—III of FIG. 2. As can be seen, assembly 12 comprises a case 13 of the differential mechanism, a lower axle housing 14 mounted on the case 13, and an upper axle housing 15 mounted on the head block of the upper end of the lower axle housing.

Case 13 comprises a substantially cylindrical side body 16, a lower case cover plate 17 fixed to the lower edge 16a of body 16, preferably with a sealing gasket therebetween (not shown), by means of bolts such as the one indicated at 18, and an upper case cover plate 19 fixed to the upper edge 16b of body 16, preferably with a sealing gasket therebetween (not shown), by means of bolts such as the one indicated at 18'. The center of the lower cover plate 17 is provided with a double interior cavity 20 and 21. Cavity 20 rotatingly receives the lower hub of the main crown gear 22 of the differential mechanism by means of a ball bearing schematically shown at 23. Cavity 21 rotatingly receives the lower end 4a of the inner coaxial drive axle 4 of the upper rotor 2 by means of a ball bearing schematically shown at 24. The lower end 4a of drive axle 4 rests on a thrust bearing 25 schematically illustrated as a single wall provided at the bottom of cavity 21.

The main crown gear 22 of the differential mechanism comprises circular plate 26 from which projects upwardly a circular projection 27 capable of carrying the pinions of the differential mechanism and which has a diameter lesser than that of plate 26. The peripheral portion of the upper face of plate 26, comprised between the external edge thereof and said circular projection 27, is radially downwardly tapered and carry gear teeth 28 which drivingly mesh with the teeth of a conical drive pinion 29 mounted on a drive shaft 30 projecting radially to the exterior of the body 16 of case 13 through an output sleeve 31 which is integrally formed with said body 16. Shaft 30 is rotatingly mounted within said sleeve 31 by means of two ball bearings schematically shown at 32 and 32'. Mounting of shaft 30 and pinion 29 is such that while the teeth of both gear are in full mesh, the inner end of pinion 29 does not touch the external surface of projection 27 of the main crown gear 22.

Within the shallow cylinder defined by the upper face of the circular plate 26 and the inner surface of projection 27, there are mounted on the latter at equidistant distances at least two pinions 33 and 34 of the differential mechanism, by means of spindles 33' and 34' in such a manner that the pinions are freely rotatable. While only two pinions are shown in the drawings, it will be understood that more than two may be provided at equidistant angular intervals on the inner surface of projection 27.

A lower crown gear 35 is mounted on the lower end of the coaxial drive axle 4 and its teeth drivingly mesh with the teeth of the lower part of the differential pinions 33 and 34. An upper crown gear 36 is mounted so that its teeth drivingly mesh with the teeth of the upper part of the differential pinions 33 and 34. This upper crown gear 36 has a central aperture through which the lower end of the inner coaxial drive axle 4 of the upper rotor may freely project while the lower end of the outer coaxial drive axle 5 of the lower rotor is fixedly secured to said upper crown gear 36.

As was already explained above, axle 5 is hollow and its inside diameter is larger than the outside diameter of the inner axle 4. Thus, when both axles are duly coaxially centered, each one may rotate freely and independently from the other and, by the way, in opposite directions. The lower end of axle 5 and the upper crown gear 36 are mantained in centered position by means of a ball bearing schematically shown at 37.

The upper cover plate 19 of the differential mechanism case 13 has a central aperture in which the lower end of a lower axle housing 38 is mounted. The inside diameter of this axle housing 38 is larger than the outside diameter of the drive axle 5 of lower rotor 3. Thus, when all the three components 4, 5 and 38 are duly centered, axle 4 may turn freely within axle housing 38. On the upper end of axle housing 38 a head block 39 is fixedly mounted.

Figure 4:
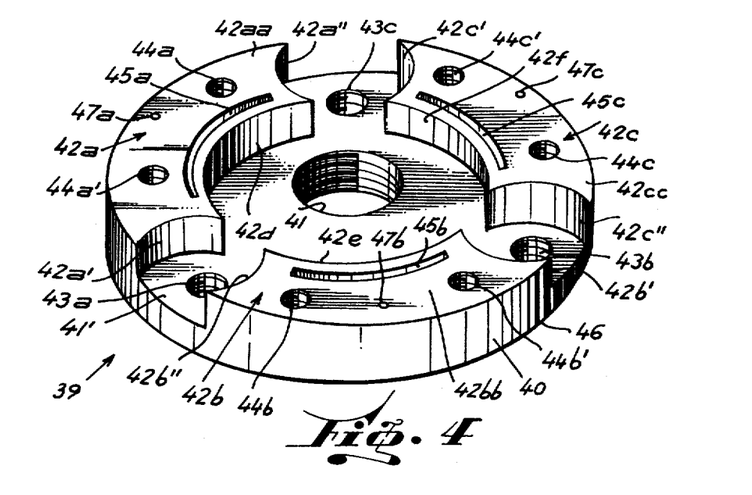
FIG. 4 is a schematic perspective view of the body of the head block of the lower axle housing.

Said head block 39 may be better seen in FIG. 4. This head block comprises a base 40 which has a screw threaded central aperture 41 which may be screwed on a complementary screw thread provided on the upper end of the lower axle housing 38. From the upper face 41 of base 40 three projections 42a, 42b and 42c rise upwardly, each one having substantially the shape of a circular crown sector. However their end faces 42a' and 42a'', 42b' and 42b'', and 42c' and 42c'', respectively, are concave instead of being straight.

Between each pair of adjacent side faces 42 there is provided a corresponding screw-threaded through aperture 43a, 43b and 43c. In each of the upper faces 42aa, 42bb and 42cc of projections 42a, 42b and 42c there are correspondingly provided two threaded blind holes 44a–44a', 44b–44b' and 44c–44c'.

In each projection 42a, 42b and 42c there is furthermore provided a corresponding slot 45a, 45b and 45c having the shape of an arc of a circle. It must be clearly beared in mind that these slots are through slots traversing all the way the head block from its lower face to its upper face. These slots offer passages for the upper rotor control elements.

Also in the upper face of each projection 42 there is provided a corresponding small blind hole which is used as a mounting guide for an upper axle housing which will be described hereinbelow.

Figure 5:
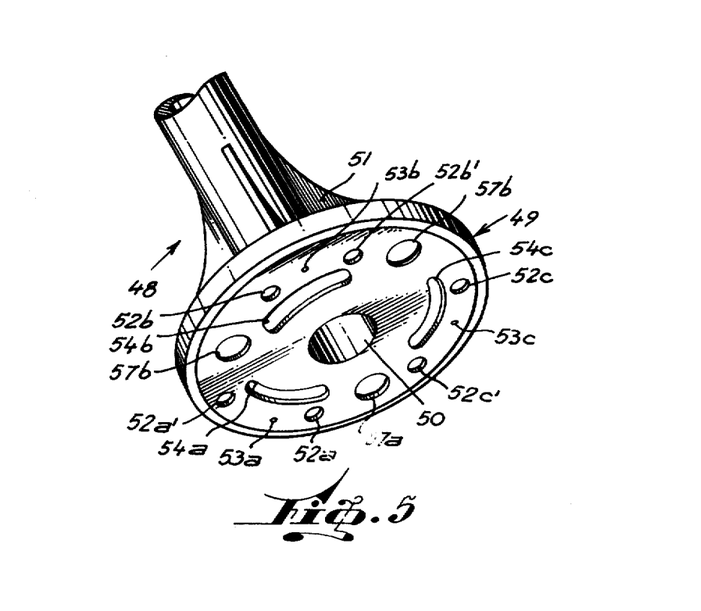
FIG. 5 is a partial schematic perspective view of the upper axle housing and its mounting base.

The lower end of the upper hollow axle housing 48 and the mounting base 49 thereof may be seen in FIG. 5.

The upper axle housing 48 is integrally made with its base 49 and both parts are coaxially aligned. Base 49 is in general a circular plate having a central aperture 50 through which the upper rotor coaxial drive axle 4 may pass in a freely rotatable manner, without touching the inner surface of aperture 50 or of hollow axle housing 48. These elements are coaxially centered by means of a ball bearing 50' (see FIG. 3). Radially projecting strengthening flanges are provided on the outer face of axle housing 48 and the upper face of its base 49, such as the one indicated at 51. Base 49 has a plurality of apertures which register with the corresponding apertures 44 of said head block 39 when the base is fixed in position on the head block 39 of the lower axle housing 14.

Base 49 is fixedly bolted on head block 39 by means of bolts as the one indicated at 49' in FIG. 2, passing through apertures 52a, 52a', 52b, 52b', 52c and 52c' provided in base 49 and which are screwed into the corresponding blind apertures 44a, 44a', 44b, 44b', 44c and 44c' of head block 39.

In base 49 there are also provided three slots 54a, 54b and 54c, each one having the shape of an arc of a circle registering exactly with the corresponding slot 45 of head block 39 when base 49 of the upper housing axle 48 is fixedly bolted on head block 39. Thus, each slot 45 of head block 39 with the corresponding registering slot 54 of base 49 offers a free continuous passage for an upper rotor control element.

Figure 6:
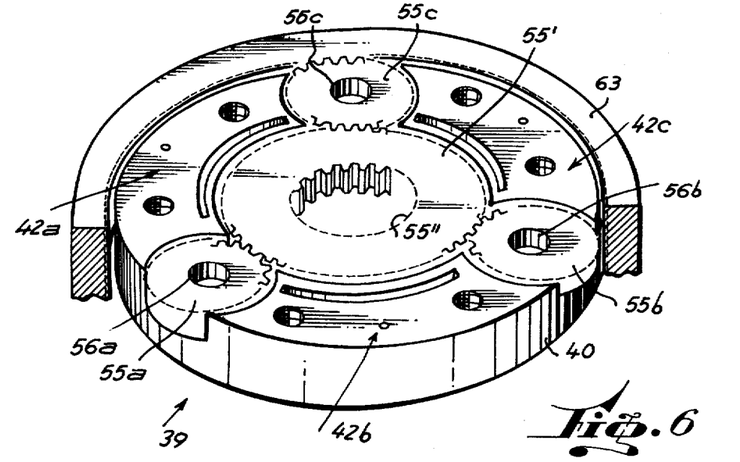
FIG. 6 is a schematic perspective view of the upper part of the gear mechanism arranged in the head block of FIG. 4.

As can be seen in FIG. 6, in each space defined between pairs of concave faces 42a'–42b'', 42b'–42c'' and 42c'–42a'' (see FIG. 4) a corresponding satellite gear 55a, 55b and 55c is freely rotatingly mounted by means of a corresponding bolt (not shown) having one end threaded and screwed into the corresponding threaded apertures 43a, 43b and 43c of the base 40 of head block 39, passing through the central apertures 56a, 56b and 56c of the corresponding satellite gear 55 and its other end fitted into a corresponding one of apertures 57a, 57b and 57c of base 49 of the upper axle housing 48.

In the circular space defined by the inner faces 42d, 42e and 42f of head block 39 there is provided a crown gear 55' the teeth of which mesh with the teeth of the satellite gears 55. Said crown gear 55' has a central aperture 55'' the inner edge of which is striated cooperating with corresponding striations (not illustrated) provided on the surface of drive axle 5.

The particular construction of the mast and differential mechanism assembly of the present invention, indicated in general in FIG. 2, offers convenient and safe spaces which allow the passage of the upper rotor control elements through the rotation inverting mechanism (head block 39 and associated components). As can be seen in FIG. 2, the upper cover plate 19 of the differential mechanism case 13 and the lower axle housing 14 have a plurality of radially projecting strengthening flanges like the one indicated at 58, each adjacent pair of which define a corresponding space in which upper rotor control elements like that indicated at 59 may slide upwardly and downwardly without interfering with the rotation of the components of the rotation inverting mechanism nor with the rotating blades of the lower rotor. Each control element 59 passes through head block 39 within the confines of the lower rotor mounting hub 60 and through mounting base 49 of the upper drive axle housing 48. This is feasible due to the provision, in the head block 39 and base 49 of the upper drive axle housing, of slots 45 which register with the corresponding slots 54, both having the same size and shape. Thus continuous passages are offered, each one respectively opening at the upper and lower surfaces of the assembly made up by head block 39 and mounting base 49. The control members, per se, do not form an innovative part of the present invention. Such control members are conventional and may take the form of rods, flat members, or cables, depending on the needs of a particular helicopter.

Moreover, control elements 59 are capable of sliding upwardly and downwardly in the spaces defined between each two adjacent strengthening flanges 51 provided on the outer surface of the upper drive axle housing 48 (see FIGS. 2 and 5).

Turning again to FIGS. 2 and 3, reference will be made to the hubs supporting the corresponding lower and upper rotors. Lower rotor 3 is mounted on the hub indicated in general at 60. Hub 60 has a hollow cylindrical shape and is freely rotatingly mounted on the lower drive axle housing 38 by means of ball bearings 61a and 61b. The upper end of the hub is externally threaded at 62 and the screw-thread cooperates with a complementary internal thread provided on the downwardly projecting edge of annular gear 63 (see also FIG. 6) which rotates about the body 40 of head block 39, its inner teeth meshing with the teeth of the satellite gears 55a, 55b and 55c.

The hub supporting the upper rotor 2 is indicated in general at 64. Hub 64 has also the shape of a hollow cylinder which is solid with the upper disc-shaped plate 65 fixed to the upper end of the upper rotor drive axle 4. Hub 64 is freely rotatingly slidable on the external surface of the upper end of the upper rotor drive axle housing 48 by means of balls bearings 66a and 66b.

The operation of the mast and differential mechanism assembly will now be described.

Once the engine 6 has been started (FIG. 1), its power output shaft drives the differential mechanism power input shaft 30 which rotates conical pinion 29. This latter rotates the main crown gear 22 on which are freely rotatingly mounted the pinions 33 and 34 of the differential mechanism. Said pinions, rotating together with the main crown gear 22, put into rotation the lower crown gear 35 to which is fixed the lower end of the upper rotor drive axle 4 and the upper crown gear 36 to which is fixed the lower end of the lower rotor drive axle 5.

According to the corresponding aerodynamic resistances offered by the air to each rotor, which depends in every instant on the flying conditions encountered by the aircraft, the drive axle corresponding to the rotor which finds lesser aerodynamic resistance will rotate at a greater angular speed than the other rotor according to the known typical properties of a differential drive mechanism. Thus the power applied to each rotor 2 and 3 will be automatically balanced in such a way that each rotor will receive in every instant the exactly correct proportion of the total power delivered by the engine and required by each rotor in every instant. This increases considerably the flight stability and easy controllability of a helicopter constructed according to the present invention. The effects of flying through highly turbulent air, the influence on the lower rotor of the instantaneous vertical slip stream of the upper rotor, and other asymmetrical conditions developing during flight and which produce instabilities and tiring pilotage operations, will thus be automatically cancelled.

Figure 7:
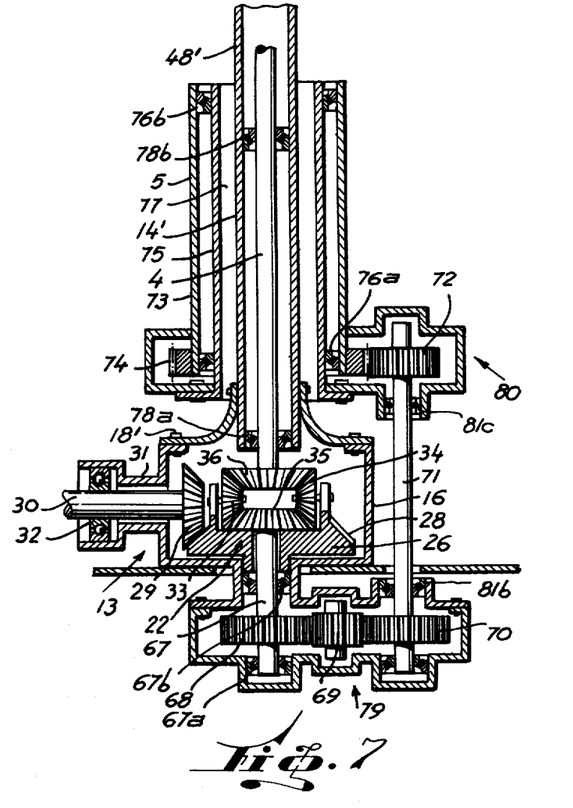
FIG. 7 is a schematic illustration of a vertical diametral cross-section of another embodiment of the assembly of the mast and differential mechanism of a helicopter of the present invention.

FIG. 7 shows another possible embodiment of this invention. This embodiment is considered less desirable than the embodiment described hereinabove with reference to FIGS. 2 to 6, because it requires more components at a higher manufacturing and assembly cost and contributes to a higher weight of the aircraft. However, from any other point of view it provides the same advantageous results as the first embodiment and thus it must be considered as comprised within the scope of this invention.

It can be seen that in this second embodiment the power input 30 and the main crown 22 of the differential mechanism is similar to that of the first embodiment. One of the most obvious constructional differences is that in the first embodiment the lower crown gear 35 is the one which drives directly the upper rotor inner axle 4 while the upper crown gear 36 is the one which drives the lower rotor outer axle 5 through the rotation inverting mechanism. In the second embodiment presently described the reverse is true; i.e., the upper crown gear 36 is the one which drives directly the upper rotor drive axle 4 while the lower crown gear 35 is the one which drives the lower rotor drive axle 5 through the rotation inverting mechanism. To this end the upper rotor drive axle 4 is directly fixed to the upper crown gear 36. Instead, downwardly projecting shaft 67 is directly fixed to lower crown gear 35 and is centered and rotatingly mounted by means of ball bearings 67a and 67b. On the lower end of shaft 67 a gear wheel 68 is fixed, its teeth meshing with the teeth of an intermediate idle gear 69 the teeth of which mesh with the teeth of another gear wheel 70 fixed on the lower end of a countershaft 71 on the upper end of which is fixed a further gear wheel 72. The lower outer surface of a lower rotor hub 73 has fixed or directly formed thereon an annular gear 74 the teeth of which mesh with gear wheel 72. The lower rotor hub 73 is concentrically arranged and is freely rotatable around a fixed inner casing 75 by means of ball bearings 76a and 76b. Lower rotor 3 is of course mounted on hub 73.

Within the inner casing 75 is concentrically arranged the lower portion 14' of the upper rotor drive axle housing. However it must be noted that the outside diameter of axle housing 14' is sufficiently smaller than the inside diameter of casing 75. Thus between both components there remains an annular hollow space 77 which is enough to allow the passage of the control elements (not shown) for the upper rotor. Within the upper portion 48' of the axle housing the upper rotor drive axle 4 is coaxially centered and freely rotatable by the interposition of mounting ball bearings 78a and 78b.

It can be seen that the differential mechanism proper, comprising the gears 22, 29, 33, 34, 35 and 36, is contained in the case 13 having a downwardly directed extension indicated in general at 79 containing the gears 68, 69 and 70. This extension 79, together with corresponding sealing gaskets, provides a fluid-tight lubricant container which allows a proper lubrication of bearings, shafts and gears therein contained. Gear 72 and crown 74 are arranged within an auxiliary annular gear-case indicated in general at 80, containing lubricant fluid. Countershaft 71 is freely rotatingly mounted by means of ball bearings 81a, 81b and 81c. Other elements are similar to those of the first embodiment and are designated with the same reference numerals.

Components of the upper part of the mast, corresponding to the upper rotor, may be similar to those of the former embodiment, or may be of a different appropriate construction. In the embodiment illustrated on FIG. 7, head block 39 (FIG. 4), crown gears 55' and 63 (FIG. 6), satellite gears 55 and base 49 of the upper drive axle housing (FIG. 5) are not necessary, since the lower rotor hub is directly drived at its lower edge portion and the upper drive axle housing 48 extends directly upwards from the gear-case 13.

Operation of this second embodiment is as follows. When engine 6 is started, its crankshaft turns the differential mechanism power input shaft 30 which drives pinion 29 driving the main crown gear 22 which carries around the pinions 33 and 34 mounted thereon. Assuming that in this moment the power requirements of both rotors are equal, pinions 33 and 34 will rotate both crown gears 35 and 36 in the same direction together with the upper rotor drive axle 4 and gear 67. This latter, through gears 68, 69 and 70, countershaft 71 and gears 72 and 74, apply power to the lower rotor hub 73.

With this second embodiment the same functional results will be obtained as with the former one; that is to say, an optimum distribution of the total available power (generated by the engine) between both rotors at every instant, according to the instantaneous loads imposed on each rotor by the aerodynamic working conditions.

While certain specific embodiments have been described, the skilled in this art will understand that some changes of details and substitutions of components may be introduced therein without altering the true spirit and scope of the invention as defined in the claims.

I claim:

1. A helicopter of the type having a power plant, two coaxial counterrotating rotors, and a drive mechanism interposed between the power plant and the rotors, said power plant having a power output shaft, wherein said drive mechanism comprises a differential mechanism having a power input shaft coupled to said power output shaft of the power plant and two power output axles including a first output axle drivingly coupled to an upper one of said rotors and a second output axle drivingly coupled to a lower one of said rotors, couplings for coupling said output axles to corresponding ones of said upper and said lower rotors only one of said couplings between said power output axles and the corresponding rotor comprising a rotation inverting mechanism, said rotation inverting mechanism comprising a fixed external axle housing surrounding said second power output axle, a head block mounted on the upper end of said axle housing, a central crown gear mounted on said head block and having a striated central aperture in which is fitted the upper end of said second power output axle having a correspondingly striated outer surface, a plurality of satellite gears freely rotatingly mounted on said head block with their teeth meshing with the teeth of said central crown gear, an annular gear rotatingly mounted around the outer surface of said head block and having internal teeth meshing with the teeth of said satellite gears, said annular gear projecting downwardly and forming a mounting hub for the blades of the lower rotor, a plurality of through slots having the shape of an arc of a circle provided in said head block, each through slot being located between a pair of adjacent ones of said satellite gears and being used to permit control members for the upper rotor to pass therethrough.

2. A helicopter of the type having a power plant, two coaxial counterrotating rotors, and a drive mechanism interposed between the power plant and the rotors, said power plant having a power output shaft, wherein said drive mechanism comprises a differential mechanism having a power input shaft coupled to said power output shaft of the power plant and two power output axles including a first output axle drivingly coupled to an upper one of said rotors and a second output axle drivingly coupled to a lower one of said rotors, couplings for drivingly coupling said power output axles with corresponding ones of said upper and said lower rotors, only one of said couplings between said power output axles and the corresponding rotor comprising a rotation inverting mechanism, said differential mechanism comprising a first pinion gear mounted on said power input shaft, a main crown gear, the teeth of said main crown gear meshing with the teeth of said first pinion gear and having an upwardly projecting annular support on the inner surface of which are freely rotatably mounted at least two differential pinion gears, an upper crown gear and a lower crown gear, the teeth of both said upper and lower crown gears meshing with the teeth of said differential pinion gears, the lower end of said first power output axle being connected to said lower crown gear and projecting freely upwardly through a control aperture in said upper crown gear and the lower end of said second power output axle being connected to said upper crown gear, said rotation inverting mechanism being provided between said second power output axle and a mounting hub for the lower rotor, said second power output axle being hollow and said first power output axle being freely rotatable therein, said rotation inverting mechanism comprising a fixed external axle housing surrounding said second power output axle, a head block mounted on the upper end of said axle housing, a central crown gear mounted on said head block and having a striated central aperture in which is fitted the upper end of said second power output axle having a correspondingly striated outer surface, a plurality of satellite gears freely rotatingly mounted on said head block with the teeth of the satellite gears meshing with the teeth of said central crown gear, an annular gear rotatingly mounted around the outer surface of said head block and having internal teeth meshing with the teeth of said satellite gears, said annular gear projecting downwardly and forming the mounting hub for the lower rotor, a plurality of through slots having the shape of an arc of a circle provided in said head block, each through slot being located between a pair of adjacent ones of said satellite gears and being used to permit control members for the upper rotor to pass therethrough.

3. A helicopter of the type having a power plant, two coaxial counterrotating rotors, and a drive mechanism interposed between the power plant and the rotors, said power plant having a power output shaft, wherein said drive mechanism comprises a differential mechanism having a power input shaft coupled to said power output shaft of the power plant and two power output axles including a first output axle drivingly coupled to an upper one of said rotors and a second output axle drivingly coupled to a lower one of said rotors, couplings for drivingly coupling said power output axles with corresponding ones of said upper and said lower rotors, only one of said couplings between said power output axles and the corresponding rotor comprising a rotation inverting mechanism, said differential mechanism and said rotation inverting mechanism comprising a first pinion gear mounted on said power input shaft, a main crown gear, the teeth of said main crown gear meshing with the teeth of said first pinion gear and having an upwardly projecting annular support on the inner surface of which are freely rotatable mounted at least two differential pinion gears, an upper crown gear and a lower crown gear, the teeth of both said upper and lower crown gears meshing with the teeth of said differential pinion gears, the lower end of said first power output axle being connected to said upper crown gear, a short shaft fixed to said lower crown gear and projecting downwardly therefrom, a first gear wheel fixed on the lower end of said short shaft, an idle pinion gear having its teeth meshing with the teeth of said first gear wheel, a second gear wheel mounted on the lower end of a countershaft and having its teeth meshing with the teeth of said idle pinion gear, said countershaft projecting upwardly from said second gear wheel, a third gear wheel mounted on the upper end of said countershaft, and an annular gear provided on the outside surface of the lower end of said second power output axle, the teeth of said annular gear meshing with the teeth of said third gear wheel, a fixed mounted axle housing within which said first power output axle is freely rotatable, a fixedly mounted tubular casing having an inside diameter which is larger than the outside diameter of said axle housing thus defining therebetween an annular passage for control members of the upper rotor, said second power output axle being freely rotatably mounted around said tubular casing and its upper end constituting a hub for the lower rotor.

4. A helicopter of the type having a power plant, two coaxial counterrotating rotors, and a drive mechanism interposed between the power plant and the rotors, said power plant having a power output shaft, wherein said drive mechanism comprises a differential mechanism having a power input shaft coupled to said power output shaft of the power plant and two power output axles including a first output axle drivingly coupled to an upper one of said rotors, and a second output axle drivingly coupled to a lower one of said rotors, couplings for drivingly coupling said two power output axles to corresponding ones of said upper and said lower rotors, only one of said couplings between said power output axles and the corresponding rotor comprising a rotation inverting mechanism, wherein said differential mechanism further comprises a first pinion gear mounted on said power input shaft, a main crown gear, the teeth of which mesh with the teeth of said first pinion gear and having an upwardly projecting annular support on the inner surface of which are freely rotatable mounted at least two differential pinion gears, an upper crown gear and a lower crown gear, the teeth of both said upper and lower crown gears meshing with the teeth of said differential pinion gears, the lower end of said first power output axle being connected to said lower crown gear and projecting freely upwardly through a central aperture in said upper crown gear, and the lower end of said second power output axle being connected to said upper crown gear, said rotation inverting mechanism being provided between said second power output axle and a lower rotor mounting hub, said second power output axle being hollow and said first power output axle being freely rotatable therein, and wherein said second power output axle is surrounded by a fixed external axle housing, said rotation inverting mechanism comprising a head block mounted on the upper end of said axle housing, a central crown gear mounted on said head block and having a striated central aperture in which is fitted the upper end of said second power output axle having a correspondingly striated outer surface, a plurality of satellite gears freely rotatingly mounted on said head block with the teeth of the satellite gears meshing with the teeth of said central crown gear, an annular gear rotatingly mounted around the outer surface of said head block and having internal teeth meshing with the teeth of said satellite gears, said annular gear projecting downwardly forming a mounting hub for blades of the lower rotor, a plurality of through slots having the shape of an arc of a circle provided in said head block, each through slot being located between a pair of adjacent ones of said satellite gears and being used to permit control members for the upper rotor to pass therethrough.

5. A helicopter of the type having a power plant, two coaxial counterrotating rotors, and a drive mechanism interposed between the power plant and the rotors, said power plant having a power output shaft, wherein said drive mechanism comprises a differential mechanism having a power input shaft coupled to said power output shaft of the power plant and two power output axles including a first output axle drivingly coupled to an upper one of said rotors, and a second output axle drivingly coupled to a lower one of said rotors, couplings for drivingly coupling said two power output axles to corresponding ones of said upper and said lower rotors, only one of said couplings between said power output axles and the corresponding rotor comprising a rotation inverting mechanism, and wherein said differential mechanism comprises a first pinion gear mounted on said power input shaft, a main crown gear, the teeth of said main crown gear meshing with the teeth of said first pinion gear and having an upwardly projecting annular support on the inner surface of which are freely rotatably mounted at least two differential pinion gears, an upper crown gear and a lower crown gear, the teeth of both said upper and lower crown gears meshing with the teeth of said differential pinion gears, the lower end of said first power output axle being connected to said upper crown gear, said rotation inverting mechanism comprising a short shaft fixed to said lower crown gear and projecting downwardly therefrom, a first gear wheel fixed on the lower end of said short shaft, an idle pinion gear having its teeth meshing with the teeth of said first gear wheel, a second gear wheel mounted on the lower end of a countershaft and having its teeth meshing with the teeth of said idle pinion gear, said countershaft projecting upwardly from said second gear wheel, a third gear wheel mounted on the upper end of said countershaft, and an annular gear provided on the outside surface of the lower end of said second power output axle, the teeth of said annular gear meshing with the teeth of said third gear wheel.

6. A helicopter according to claim 5, wherein said first power output axle is freely rotatingly mounted within a fixedly mounted axle housing, said axle housing being surrounded by a fixedly mounted tubular casing having an inside diameter which is larger than the outside diameter of said axle housing thus defining therebetween an annular passage for control members of the upper rotor, said second power output axle being freely rotatably mounted around said tubular casing and its upper end constituting a hub for the lower rotor.

* * * * *